Aug. 3, 1954 B. FISK ET AL 2,685,643

DUAL-DIVERSITY RECEIVING SYSTEM

Filed Dec. 8, 1948 3 Sheets-Sheet 1

INVENTORS
BERT FISK
CHARLES A. SPENCER
BY M. A. Hayes
ATTORNEY

INVENTORS
BERT FISK
CHARLES A. SPENCER
BY
[signature]
ATTORNEY

Aug. 3, 1954 B. FISK ET AL 2,685,643

DUAL-DIVERSITY RECEIVING SYSTEM

Filed Dec. 8, 1948 3 Sheets-Sheet 3

INVENTORS
BERT FISK
CHARLES A. SPENCER
BY
M. A. Hayes
ATTORNEY

Patented Aug. 3, 1954 2,685,643

UNITED STATES PATENT OFFICE 2,685,643

DUAL-DIVERSITY RECEIVING SYSTEM

Bert Fisk and Charles L. Spencer, Washington, D. C.

Application December 8, 1948, Serial No. 64,067

6 Claims. (Cl. 250—20)

(Granted under Title 35, U. S. Code (1952), sec. 266)

This invention relates generally to diversity receiving systems, and more particularly, to a system operating with a pair of ordinary communication receivers to provide dual diversity reception.

Techniques for reducing the effect of signal fading in radio receivers, known as diversity reception, have been practiced in varying forms for a considerable period of time. In general, diversity reception depends upon the location of receiving antennas at widely spaced points, said points being selected so that it may reasonably be presumed that the signal will not fade simultaneously at each of the antenna locations. Usually, signals from each antenna are separately amplified and these signals are either combined or the stronger signal is selected.

Apparatus familiar to the prior art for accomplishing diversity reception is designed and built especially for this purpose. It requires a receiver having a number of separate signal amplifying channels and must include a manual or automatic means for combining or selecting the signals. The result has been an expensive collection of bulky equipment which has no other utility. Many prior art systems have an unfortunately slow switching action, particularly for use with frequency-shift signals. Signal combination systems have been found to adversely affect receiver fidelity because of cross modulation due to phase differences between simultaneously received signals and the added noise due to the poor signal to noise ratio in the fading signals. These conditions are also present in signal selection systems due to ineffective isolation of the unselected signals.

Therefore, it is an object of the invention to provide a diversity receiving system requiring a minimum of equipment in cooperation with a pair of ordinary communication receivers.

It is another object of this invention to provide a simple modification for using a pair of ordinary communication receivers in a dual diversity receiving system.

It is another object of this invention to provide an improved automatic electronic signal selection circuit providing a very rapid and positive switching action.

It is another object of this invention to provide a diversity receiving system free of increased noise and cross modulation effects.

Other objects and features of this invention will be apparent from the following description and accompanying drawings wherein similar characters of reference indicate similar parts.

Briefly, this invention teaches a simple dual diversity receiving system operating from a pair of ordinary communication receivers. In accordance with this invention, the local oscillator of one receiver is disabled and the local oscillator of the other is used with both receivers to facilitate tracking. The A. V. C. voltage from each receiver is applied to separate inputs of a balanced bridge switch tube operative to deliver a control voltage of one level when one A. V. C. voltage is greater and of another level when the other A. V. C. voltage is greater. The control voltage from the switch tube is applied to one flip-flop grid of a highly modified Eccles-Jordan flip-flop circuit wherein the screen grids are used as flip-flop anodes. Each screen grid is returned to ground through a series resonant circuit tuned to the intermediate frequency and operative to further isolate the receiver signals and speed up the flip-flop action. The IF signal from each receiver is applied to a control grid of separate flip-flop tubes. The anodes of these tubes are tied together and the IF signal of the receiver having the stronger A. V. C. will appear at said anodes, the flip-flop action being controlled by the control voltage from the balanced bridge switch tube.

Figure 1:
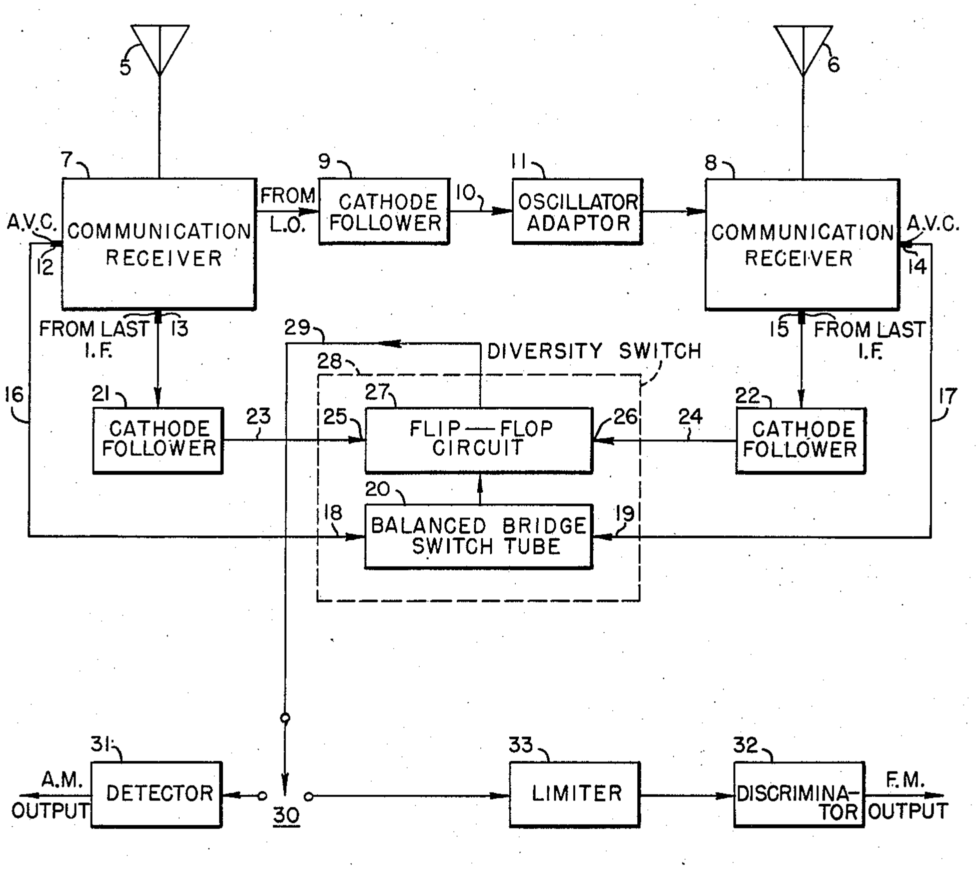
Fig. 1 is a block diagram of the complete dual diversity system of this invention.

Referring now to Fig. 1 in detail, the antennas 5 and 6 are typically spaced apart at least 1000 feet. The signals from said antennas 5 and 6 are fed respectively to a pair of receivers 7 and 8. At least one of the antenna leads should be of considerable length so that receivers 7 and 8 may be located at the same place. The communication receivers may be of any standard type employing a superheterodyne circuit and having A. V. C. For example, the Navy type RBC–1 communication receiver has been used extensively in the practice of this invention.

The local oscillator signal from one receiver 7 is fed through a cathode follower 9, and a coaxial cable 10 to an adapter 11. The adapter 11 applies the local oscillator signal from receiver 7 to the first detector stage of receiver 8. This arrangement will be discussed in detail in connection with Fig. 2.

The A. V. C. voltage and IF signal of each receiver is made available at terminals 12, 13, 14 and 15 respectively. The A. V. C. voltage from each receiver is applied through coaxial cables 16 and 17 to separate input grids 18 and 19 of the balanced bridge switch tube 20. The IF signal from each receiver is fed through cathode followers 21 and 22, and coaxial cables 23 and 24 to separate control grids 25 and 26 of the flip-flop circuit 27 and together tube 20 and circuit 27 comprise the diversity switch 28 of the system. As will be discussed in detail in connection with Fig. 3, the stronger IF signal, as determined by the relative A. V. C. voltage amplitudes, will appear at the output 29 of the diversity switch. According to the embodiment herein disclosed, the signal output from the flip-flop circuit is the undetected IF signal of one of the receivers. This signal is fed to a single pole double throw switch 30. If the receivers are operating with amplitude modulated signals the output 29 is switched to an AM detector 31. If the receivers are operating with frequency modulated or frequency shift signals, switch 30 should be thrown to the right connecting output 29 to a discriminator 32 through a limiter 33.

Figure 2:
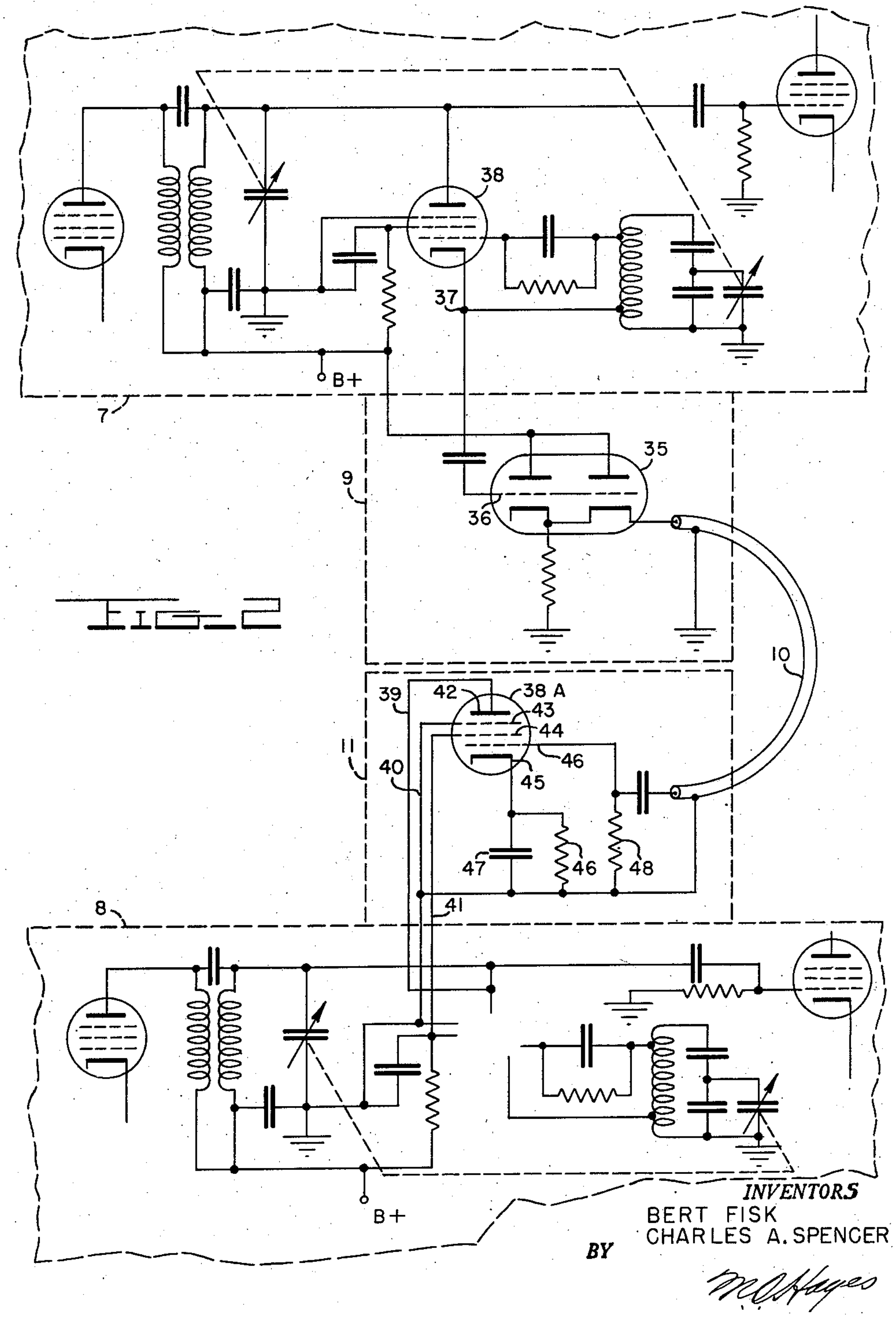
Fig. 2 is a schematic diagram of a portion of Fig. 1 showing the interconnection of the local oscillators of a pair of ordinary communicating receivers.

Fig. 2 shows in detail the arrangement of oscillator adaptor 11 and its connection to receiver 8 and to receiver 7 through cathode follower 9. A portion of the circuit of receivers 7 and 8 is shown in this figure, the circuit being that of the Navy type RBC-1 communication receiver. For the sake of simplicity the band switching arrangement has been omitted from the drawing. The cathode follower 9 is preferably attached to the chassis of the receiver 7 thus permitting short leads for its connection and enabling it to use the receiver power supply. The cathode follower shown here uses a dual triode tube 35 of the 6J6 type with its triode elements connected in parallel. The cathode follower grids 36 are capacity coupled to any convenient point in the oscillator circuit of receiver 7, such as the cathode 37 of the oscillator tube 38.

The oscillator adaptor 11 is most conveniently a plug in unit. The oscillator tube 38A of receiver 8 is removed from its socket and the oscillator adaptor plugged in its place. Another tube socket may be provided in the adaptor and the oscillator tube 38A placed in this additional socket. By means of the plug in oscillator adaptor the function of tube 38A is changed from that of an oscillator to that of an amplifier.

The wiring of plug in adaptor 11 is shown in detail in Fig. 2. The plate 42, suppresser grid 43 and screen grid 44 of tube 38A connect to their original points in the receiver circuit through leads 39, 40 and 41 respectively, but the cathode 45 and control grid 46 are disconnected from the receiver oscillator circuit. The cathode 45 is returned to ground by lead 40 through a bias resistor 46 paralleled by a bypass condenser 47. The control grid is similarly returned to ground through a resistance 48 and is capacity coupled to the coaxial line 10 connected to the cathode output of cathode follower 9. By this means the same local oscillator signal used in receiver 7 is amplified and applied to a corresponding point in receiver 8.

Figure 3:
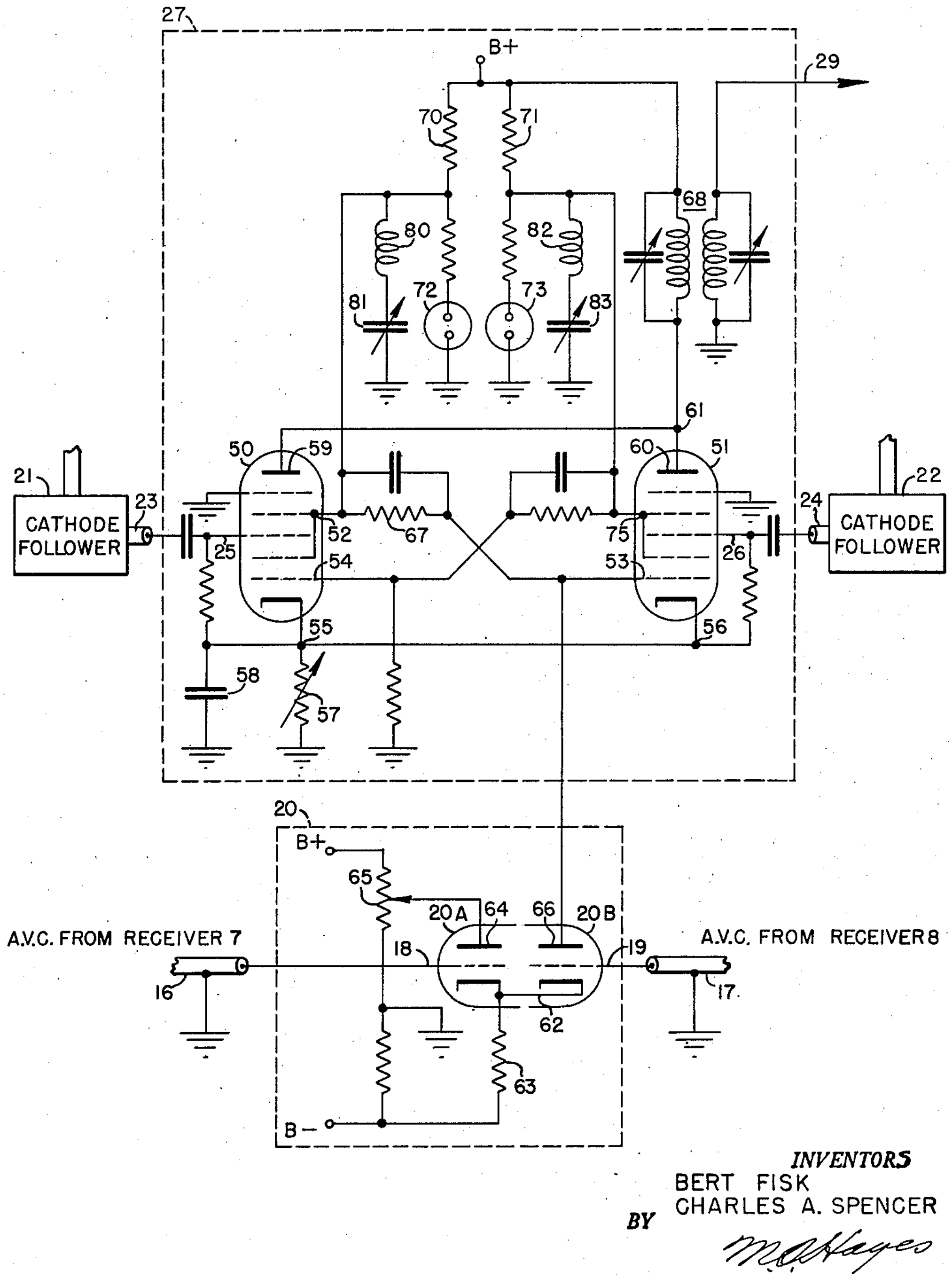
Fig. 3 is a schematic diagram of the signal selector circuit of Fig. 1.

Referring now to Fig. 3, which shows the diversity switch 28 of Fig. 1 in detail, the flip-flop circuit 27 preferably employs a pair of pentagrid tubes 50 and 51 in a highly modified Eccles-Jordan flip-flop circuit. The respective screen grids 52 and 75 of said tubes operate as the flip-flop anodes.

The screen grid 52 of tube 50 is resistance-capacitance coupled to the control grid 53 of tube 51. Similarly, the screen grid 75 of tube 51 is resistance-capacitance coupled to the control grid 54 of tube 50. Their cathodes 55 and 56 are tied together and to ground through a variable resistance 57 which is made variable to provide a control over the minimum signal amplitude necessary to switch the flip-flop circuit.

The IF signal is taken from the last IF stage of receivers 7 and 8 and applied respectively through cathode followers 21 and 22 to second control grid 25 of tube 50 and second control grid 26 of tube 51. Cathode followers 21 and 22 may be of any conventional arrangement such as portrayed by cathode follower 9 of Fig. 2, and, along with the diversity switch, are preferably operated from the receiver power supplies. The flip-flop tubes operate such that when tube 50 is conducting tube 51 is not and vice versa, and the circuit is stable in either operating condition.

The anodes 59 and 60 of tubes 50 and 51 are tied together, the signal appearing at the second control grid of one of the tubes will appear at its anode when that tube is conducting and hence will appear at the common anode terminal 61. Therefore the receiver IF signal appearing at the common anode terminal 61 will be the signal applied to the conducting tube. Therefore, it remains to control the conducting status of the flip-flop circuit in accordance with the received signal strength in order to have the stronger receiver signal appear at the common anode terminal 61. Since the amplitude of a receiver's A. V. C. voltage is a measure of the received signal amplitude, the A. V. C. voltage is an excellent and convenient medium for measuring the received signal strength.

To make this system operative the respective receiver A. V. C. voltages must be compared in amplitude and the result used to control the flip-flop circuit. The A. V. C. from receiver 7 is applied through cable 16 to control grid 18 of the balanced bridge switch tube 20. The A. V. C. from receiver 8 is applied through cable 17 to control grid 19 of said tube 20. Tube 20 is preferably a dual triode comprising sections 20A and 20B. Their cathodes 62 are tied together and to a negative voltage through biasing resistor 63. It may be necessary to modify one of the receiver power supplies in order to obtain the negative voltage. Control grid 18 is part of tube section 20A, whose anode 64 connects to a positive voltage the magnitude of which may be varied by a sliding tap on bleeder resistance 65. Control grid 19 is part of tube section 20B whose anode 66 is tied to the control grid 53 of tube 51 in the flip-flop circuit. The plate supply potential for anode 66 is obtained from screen grid 52 of tube 50 through its resistance coupling 67 to control grid 53 of tube 51.

In operation, if for example the A. V. C. voltage from receiver 8 is greater than that of receiver 7, section 20A will conduct and section 20B will be cut off because of the common cathode bias resistor 63, thus permitting control grid 53 of tube 51 to rise in voltage to a point where the circuit will flip so that tube 51 is conducting. This position of equilibrium permits the IF signal from receiver 8 to be amplified and passed on, while the IF signal from receiver 7 is blocked by nonconducting tube 50. If the A. V. C. voltage from receiver 7 becomes greater than that of receiver 8, section 20A is cut off and section 20B conducts, pulling grid 53 of tube 51 down to the point where the flip-flop circuit flops to the position of equilibrium where tube 50 conducts and tube 51 is cut off. This permits the IF signal of receiver 7 to be amplified and passed on while the IF signal of receiver 8 is blocked by nonconducting tube 51.

The amplified IF signal of the receiver having the greater A. V. C. voltage will appear at the common anode terminal 61 of the flip-flop circuit. Here it is applied to a transformer 68 tuned to the receiver intermediate frequency. The output of this transformer is the diversity switch output 29 referred to above in connection with Fig. 1.

The screen grids 52 and 75, operating as the flip-flop anodes, are supplied a positive potential through resistances 70 and 71 respectively. A voltage drop will appear across one of the resistances 70 and 71 depending upon which flip-flop tube is conducting. Therefore the conductive status of flip-flop tubes 50 and 51 may be indicated by connecting neon lamps 72 and 73 between grids 52 and 75 and ground respectively. Either of said lamps will glow when the respective tube to which it connects is not conducting. These lamps are useful in indicating which receiver is currently receiving the larger signal and also in indicating the flip-flop action of the circuit for testing its proper operation.

The screen grid 52 of tube 50 is connected to ground through a series resonant circuit consisting of an inductance 80 and a capacitance 81. Similarly, screen grid 75 of tube 51 is tied to ground through a series resonant circuit consisting of inductance 82 and capacitance 83. Each of these resonant circuits are tuned to the receiver intermediate frequency thus providing a low impedance path to ground for the received signals at screen grids 52 and 75. By this means the unselected receiver signal, which appears at the control grid of the nonconducting flip-flop tube, is prevented from feeding into the conducting tube through the flip-flop coupling circuits. Cross modulation and noise effects from the unselected signals are very thoroughly eliminated by the series resonant circuits.

Said series resonant circuits provide the additional advantage of increasing the switching rate of circuit 27. Suppose for example that the switch tube 20 has applied a change in potential on grid 53 and the switching cycle begins in tubes 50 and 51. The accompanying change in potential on screen grids 52 and 75, instead of being retarded by the usual large screen bypass condenser is actually accelerated by an inductive surge produced by inductances 80 and 82. In the practice of this invention, addition of these tuned circuits was found to shorten the switching time by at least a factor of ten. The flip-flop circuit of Fig. 3 will switch within one cycle at an intermediate frequency of 400 kc.

Although certain specific embodiments of this invention have been herein disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. In combination, a pair of radio receivers each having an automatic volume control channel therein, first and second electronic switching circuits each having a pair of vacuum tubes, each of said pairs of vacuum tubes being interconnected so that when one tube of a pair is conducting the other is nonconducting, each of said tubes having an input grid, separate means supplying the undetected signals from each of said receivers to an input grid of said first pair of tubes, a detector, said first pair of tubes having a common output operative to deliver the receiver signal applied to the conducting tube to said detector, separate means applying the automatic volume control voltage from each receiver to an input grid of said second pair of tubes for controlling the conductive status of said tubes, one of said second pair of tubes being connected to the interconnection of said first pair of tubes for controlling the conductive status of said first pair of tubes in response to the conductive status of said second pair of tubes.

2. In combination, a pair of radio receivers each having an automatic volume control channel and a local oscillator channel, means connected between said local oscillators for supplying the local oscillator signal of one receiver to both receivers, first and second electronic switching circuits each having a pair of vacuum tubes, each of said pairs of vacuum tubes being interconnected so that when one tube of a pair is conducting the other is non-conducting, each of said tubes having an input grid, separate means supplying the undetected signals from each of said receivers to an input grid of said first pair of tubes, a detector, said first pair of tubes having a common output operative to deliver the receiver signal applied to the conducting tube to said detector, separate means applying the automatic volume control voltage from each receiver to an input grid of said second pair of tubes for controlling the conductive status of said tubes, one of said second pair of tubes being connected to the interconnection of said first pair of tubes for controlling the conductive status of said first pair of tubes in response to the conductive status of said second pair of tubes.

3. In combination, a pair of radio receivers each having an automatic volume control channel and a local oscillator therein, circuit means connected between said local oscillators including components which change the function of one oscillator to an amplifier, said circuit means supplying the signal from the other oscillator to said amplifier, first and second electronic switching circuits each having a pair of vacuum tubes, each of said pairs of vacuum tubes being interconnected so that when one tube of a pair is conducting the other is non-conducting, each of said tubes having an input grid, separate means supplying the undetected signals from each of said receivers to an input grid of said first pair of tubes, a detector, said first pair of tubes having a common output operative to deliver the receiver signal applied to the conducting tube to said detector, separate means applying the automatic volume control voltage from each receiver to an input grid of said second pair of tubes for controlling the conductive status of said tubes, one of said second pair of tubes being connected to the interconnection of said first pair of tubes in response to the conductive status of said second pair of tubes.

4. In combination, a pair of radio receivers each having an automatic volume control channel therein, a first electronic switching circuit having a pair of vacuum tubes, said pair of vacuum tubes being interconnected so that when one tube is conducting the other is non-conducting, each of said tubes having an input grid, separate means supplying the undetected signals from each of said receivers to an input grid of each of said tubes, a detector, said tubes having a common output operative to deliver the receiver signal applied to the conducting tube to said detector, a second electronic switching circuit having two inputs and one output, means respectively connecting the automatic volume control voltages from said receivers to the inputs of said second circuit, said second circuit being operative to deliver an output potential of one amplitude when one automatic volume control voltage is greater and an output potential of a different amplitude when the other is of greater amplitude, means connecting the output of said second circuit to the interconnection of said pair of tubes for controlling the conductive status of said tubes in response to the relative amplitude of the automatic volume control voltages of said pairs of receivers.

5. In combination, a pair of superheterodyne radio receivers having automatic volume control and the same intermediate frequency, first and second electronic switching circuits each having a pair of vacuum tubes, each of said pairs of vacuum tubes being interconnected so that when one tube of a pair is conducting the other is nonconducting, each of said tubes having an input grid, separate means supplying the undetected intermediate frequency signals from each of said receivers to an input grid of said first pair of tubes, a detector, each of said first pair of tubes having an output electrode separate from its switching electrodes, said output electrodes being connected together and to said detector, a pair of low impedance paths to ground each connected to a switching electrode of one of said first pair of tubes, separate means applying the automatic volume control voltage from each receiver to an input grid of said second pair of tubes for controlling the conductive status of said tubes, one of said second pair of tubes being connected to the interconnection of said first pair of tubes for controlling the conductive status of said first pair of tubes in response to the conductive status of said second pair of tubes.

6. In combination, a pair of superheterodyne radio receivers having automatic volume control and the same intermediate frequency, first and second electronic switching circuits each having a pair of vacuum tubes, each of said pairs of vacuum tubes being interconnected so that when one tube of a pair is conducting the other is nonconducting, each of said tubes having an input grid, separate means supplying the undetected intermediate frequency signals from each of said receivers to an input grid of said first pair of tubes, a detector, each of said first pair of tubes having an output electrode separate from its switching electrodes, said output electrodes being connected together and to said detector, a pair of tuned circuits having low impedance at the receiver intermediate frequency, each of said pairs of tuned circuits being connected between ground and a switching electrode of one of said first pair of tubes, separate means applying the automatic volume control voltage from each receiver to an input grid of said second pair of tubes for controlling the conductive status of said tubes, one of said second pair of tubes being connected to the interconnection of said first pair of tubes for controlling the conductive status of said first pair of tubes in response to the conductive status of said second pair of tubes.

References Cited in the file of this patent

UNITED STATES PATENTS

| Number | Name | Date |
|---|---|---|
| 2,189,317 | Koch | Feb. 6, 1940 |
| 2,253,867 | Peterson | Aug. 26, 1941 |
| 2,260,933 | Cooper | Oct. 28, 1941 |
| 2,269,594 | Mathes | Jan. 13, 1942 |
| 2,290,992 | Peterson | July 28, 1942 |
| 2,300,999 | Williams | Nov. 3, 1942 |
| 2,348,016 | Michel | May 2, 1944 |
| 2,414,111 | Lyons | Jan. 14, 1947 |
| 2,436,482 | Miller et al. | Feb. 24, 1948 |
| 2,494,309 | Peterson et al. | Jan. 10, 1950 |
| 2,495,826 | Schock | Jan. 31, 1950 |
| 2,515,055 | Peterson | July 11, 1950 |
| 2,515,668 | Schock et al. | July 18, 1950 |
| 2,545,214 | Schock | Mar. 13, 1951 |
| 2,555,557 | Peterson et al. | June 5, 1951 |